United States Patent [19]

Sperlich

[11] Patent Number: 4,644,534
[45] Date of Patent: Feb. 17, 1987

[54] TDMA POINT-TO-MULTIPOINT COMMUNICATIONS SYSTEM AND ITS USE

[75] Inventor: Josef Sperlich, Backnang, Fed. Rep. of Germany

[73] Assignee: ANT Nachrichtentechnik GmbH, Backnang, Fed. Rep. of Germany

[21] Appl. No.: 751,241

[22] Filed: Jul. 2, 1985

[30] Foreign Application Priority Data

Jul. 3, 1984 [DE] Fed. Rep. of Germany ....... 3424369

[51] Int. Cl.⁴ ................................................ H04J 3/16
[52] U.S. Cl. ........................................ 370/95; 370/104
[58] Field of Search .......................... 370/104, 105, 95; 340/825.5

[56] References Cited

U.S. PATENT DOCUMENTS

| 4,204,093 | 5/1980 | Yen ........................................ 370/95 |
| 4,574,379 | 3/1986 | Eng et al. ............................. 370/104 |
| 4,577,316 | 3/1986 | Schiff .................................... 370/104 |
| 4,583,217 | 4/1986 | Kittle .................................... 370/95 |

Primary Examiner—Douglas W. Olms
Assistant Examiner—Curtis Kuntz
Attorney, Agent, or Firm—Spencer & Frank

[57] ABSTRACT

A TDMA point-to-multipoint communications system composed of a central station and a plurality of substations, with multiple utilization of a transmission band and with the transmission time between the central station and the substations having a different value for each substation, is operated to effect transmission between the central station and the substations in a succession of time frames, by the steps of:

transmitting from the central station, during a first time period, a succession of signal groups, each directed to a respective substation, in a sequence such that the first transmitted signal group is directed to the substation having the longest associated transmission time and the last transmitted signal group is directed to the substation having the shortest associated transmission time;

transmitting a respective signal group from each substation to the central station during a second time period following the first time period, the respective signal group being transmitted from each substation at a selected time after completion of transmission to that substation of a signal group from the central station during the first time period, the selected times being such that transmission from the substations during the second time period is in an order inverse to the order in which signal groups are transmitted to the substations during the first time period, and the selected times including the time required for each substation to switch from a receiving state to a transmitting state.

6 Claims, 5 Drawing Figures

TDMA POINT-TO-MULTIPOINT COMMUNICATIONS SYSTEM AND ITS USE

BACKGROUND OF THE INVENTION

The present invention relates to a communications system of the type including a central station and a plurality of substations. Such a communications system is disclosed, for example, in "Digitale Verfahren der Nachrichtentechnik" [Digital Communications Methods], Proceedings of the Conference of Professors, 1979, at the Fernmeldetechnisches Zentralamt, at pages 129-160. Reference to multiple utilization of the transmission band in connection with TDMA [Time Division Multiple Access] communications systems has already been made in the periodical "Frequenz" [Frequency], Volume 25, 1971, No. 10, pages 294-298.

In TDMA communications systems whose substations are connected together by way of a central station, the waiting times for frame establishment are fixed by the central station which informs the substations thereof. In the communications systems disclosed in "Digitale Verfahren . . . ", supra, the relatively long signal delay times between satellite and ground stations make multiple utilization of the transmission path, particularly two-way transmission in the same frequency band, somewhat inefficient with respect to the information density that can be processed.

SUMMARY OF THE INVENTION

It is therefore an object of the present invention to provide a communications system in which the shortest possible pauses occur in the central station between transmitting and receiving cycles.

This and other objects are realized, according to the present invention, by a method for operating a TDMA point-to-multipoint communications system composed of a central station and a plurality of substations, with multiple utilization of a transmission band and with the transmission time between the central station and the substations having a different value for each substation, the method comprising effecting transmission between the central station and the substations in a succession of time frames, the step of effecting transmission comprising, during each time frame:

transmitting from the central station, during a first time period, a succession of signal groups, each group being directed to a respective substation, in a sequence such that the first transmitted signal group is directed to the substation having the longest associated transmission time and the last transmitted signal group is directed to the substation having the shortest associated transmission time;

transmitting a respective signal group from each substation to the central station during a second time period following the first time period, the respective signal group being transmitted from each substation at a selected time after completion of transmission to that substation of a signal group from the central station during the first time period; and providing, in each signal group transmitted from the central station during the first time period, an indication of the selected time for transmitting from each substation during the second time period, the selected times being such that transmission from the substations during the second time period is in an order inverse to the order in which signal groups are transmitted to the substations during the first time period, and the selected times including the time required for each substation to switch from a receiving state to a transmitting state.

The objects according to the invention are further achieved by a communications system constructed to operate according to the above-described method.

The communication system and method according to the present invention is particularly suitable for terrestrial applications. In terrestrial transmissions, the maximum delay time $$t_{nmax} = (t_{M/I}) I_n$$

where $(t_{M/I})$ = the specific delay, or the delay per unit distance, of the transmission medium (cable, optical fiber, free space) and $I_n$ = distance of the central station from the respective substation, is generally small compared to the frame duration $t_R$, so that frame establishment according to the present invention makes possible the multiple utilization of the transmission band without problems for the forward and return direction. Only a pause of $2t_1 + W_1$ occurs at the central station between transmit and receive cycles ($t_1$ = signal delay between central station and closest substation, $W_1$ = waiting time—switching between receive and transmit operation—in the substation closest to the central station).

The present invention will now be described in greater detail with reference to the drawings.

DESCRIPTION OF THE PREFERRED EMBODIMENTS

Figure 1:
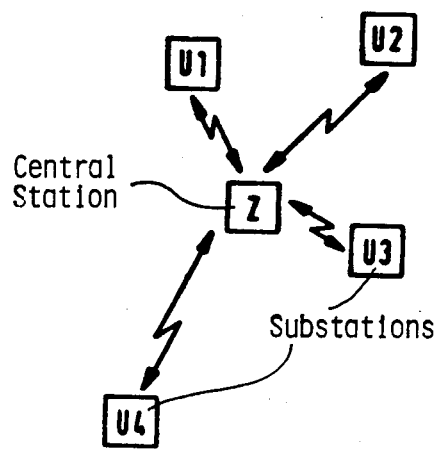
FIGS. 1 and 2 are block diagrams of basic system arrangements.

In the terrestrial point-to-multipoint communications system shown in FIG. 1, substations U1, U2, U3, U4 are in radio contact via a central station Z. Central station Z must here be placed at such a centrally disposed location that it lies within the radio range of all substations.

Figure 3:
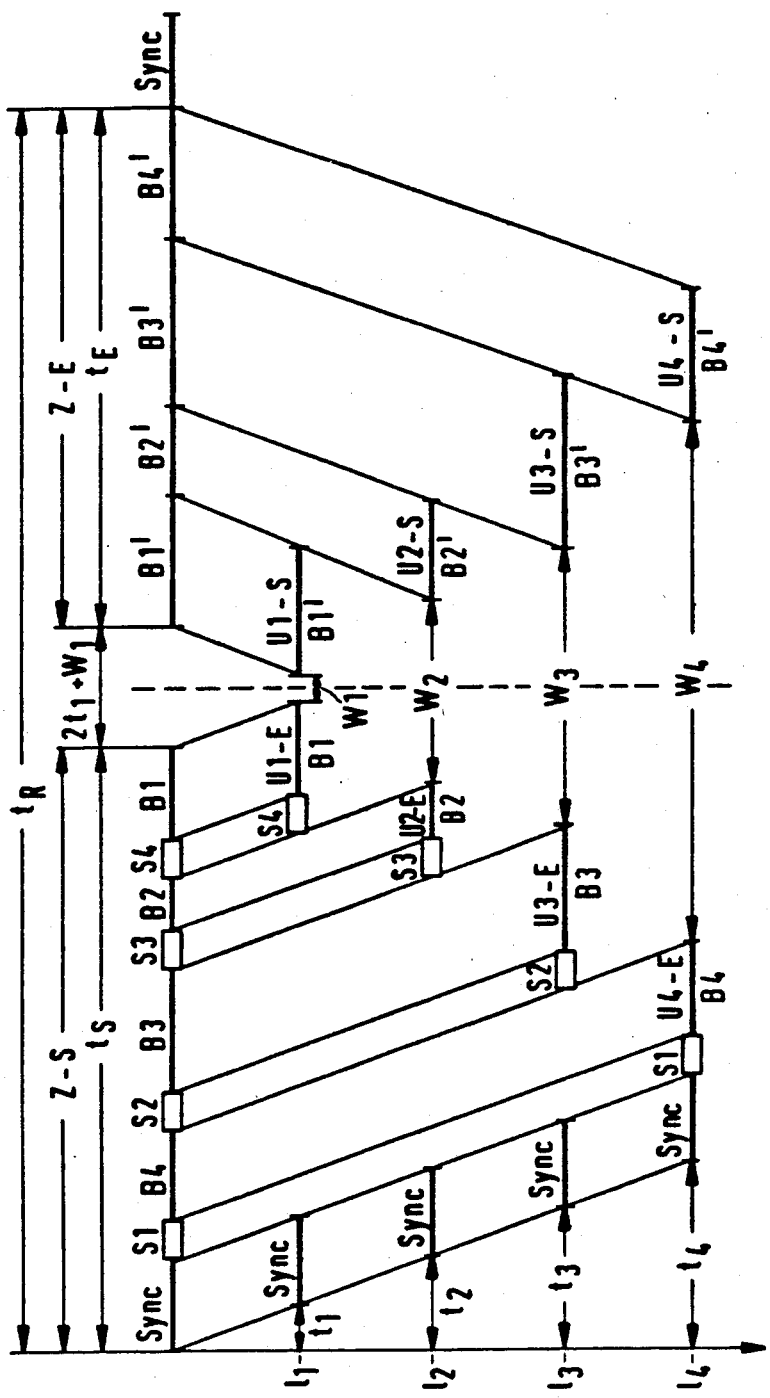
FIG. 3 shows a frame structure according to the present invention.

Communications take place according to the TDMA method with a frame structure as shown in FIG. 3. Each frame has a duration $t_R$ and includes a transmitting period Z-S of duration $t_S$ during which signals are transmitted by central station Z to all substations and a receiving period Z-E of duration $t_E$ during which signals from the substations are received by station Z. Central station Z transmits bursts to substations U1 to U4 in the following sequence: after a synchronizing word Sync, a burst B4 is transmitted to substation U4, which is the station farthest from central station Z. Burst B4 is introduced by a synchronous character S1 which contains information regarding the waiting time $W_4$ for station U4 between the end of reception at station U4 and the beginning of a subsequent transmission from that same station. This burst B4 arrives together with sync word Sync at substation U4 after a delay $t_4$. $I_4$ indicates the distance between central station Z and substation U4.

Burst B4 is followed by burst B3 for substation U3 which is the second most remote station from central station Z, being at a distance $I_3$ from station Z, with this burst being preceded by a sync character S2 containing information regarding the waiting time $W_3$ for this station with respect to the start of its subsequent transmission. The transmission from station Z begins arriving at substation U3 after a time $t_3$. The sequence of bursts is continued until burst B1 for substation U1 which is closest to central station Z. This completes the transmitting period Z-S of central station Z within a TDMA frame of duration $t_R$.

After arrival of burst B1 at substation U1, the latter, which is closest to central station Z, begins transmitting a burst B1' to central station Z. However, this takes place only after the expiration of a waiting time $W_1$ which begins at the end of reception of burst B1 by substation U1. This waiting time $W_1$ considers, in particular, the time required for substation U1 to switch from receive to transmit operation. The other substations, U2 to U4, transmit their bursts B2' to B4' after respective waiting periods $W_2$ to $W_4$ with respect to the ends of their received bursts B2 to B4, with the substations closest to central station Z going first and substation U4, which is farthest remote from central station Z, going last.

The durations of the different waiting periods $W_1$ to $W_4$ are given by central station Z which informs each substation U individually either, as shown in FIG. 3, at the beginning of the respective burst in the form of, or as part of, sync character S1 ... S4, or in the sync word Sync of the frame transmitted by central station Z. These waiting periods $W_1$ to $W_4$ depend not only on the delay time for a specific substation with respect to the central station, but also on the burst times of the closer substations which are indicated by central station Z depending on the traffic requirements of the individual substations.

Waiting periods $W_1$ to $W_4$ are selected in such a manner that bursts B1' to B4' transmitted by substations U1 to U4 follow one another without interruption when received at central station Z during its receive period $t_E$. Between the transmit period $t_S$ and the receive period $t_E$ of central station Z, there is, within frame $t_R$, a transition period of $2t_1+W_1$, where $t_1$ is the signal propagation time, or delay, between station Z and substation U1 closest to central station Z, and $W_1$, as already mentioned, characterizes, in particular, the time required for the closest substation, U1, to switch from transmit to receive.

The same radio frequency band is used for transmit bursts B1 to B4 from central station Z to substations U1 to U4 as well as for transmitting bursts B1' to B4' from substations U1 to U4 to central station Z and the transmission in the two directions takes place according to the time separated position method. The method is also called "ping pong transmission method". That means transmission and reception of—in most cases—digital information alternates as in a half duplex mode of transmission. Especially in case of speech transmission the information (e.g. PCM, DPCM, Delta modulated speech) which arrives continuously at the transmitter from the speaker during a frame-period $t_R$ (FIG. 3) is time compressed and transmitted as a part of one burst. At the receiver the packetised information is expanded and continuously given to the earphone.

Figure 2:
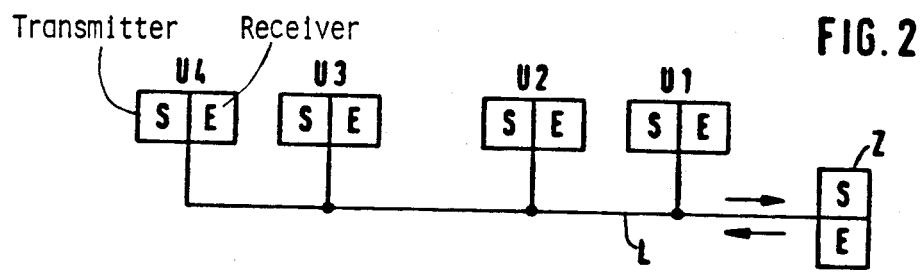

In the communications system of FIG. 2, signals are transmitted via a conductor L. Station Z and each substation U is composed of a transmitter section S and a receiver section E. For both transmission directions between each substation U1 to U4 and central station Z only one conductor L is available, with transmission possible only in one frequency band serving as the transmission band, or, for an optical conductor, only on one light wavelength as the transmission band. The frame structure for the embodiment according to FIG. 2 is the same as shown in FIG. 3.

For such conductor bound transmissions, particularly for optical fiber transmission paths, the type of transmission according to the present invention is particularly suitable since, due to the low attenuation of the optical conductor, it permits even larger distances to be bridged without intermediate amplifiers and has correspondingly effective delay times.

Figure 4:
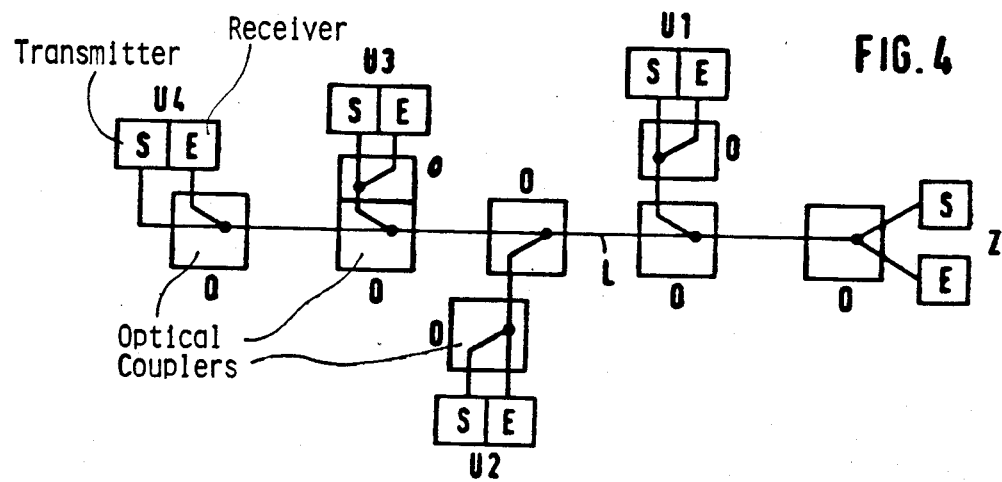
FIG. 4 shows a system arrangement according to the invention employing optical conductors.

As shown in FIG. 4, coupling in and out of the signals at central station Z and at substations U1 to U4 can be effected by means of passive optical souplers 0—for example welded couplers. The attenuations occurring then, $\approx 4,5$ dB per coupler, must be considered correspondingly in the attenuation scheme. As shown in FIG. 4, the stations at both ends of the optical fiber need only one optical coupler 0, whereas the stations U1, U2, U3 coupled on the line need two couplers 0.

Bursts B1' to B4' likewise contain sync characters, e.g. S1' to S4', and permit the receiver unit E of central station Z to set itself to the respective phase position of the receiving clock pulse of the respective burst.

With respect to simple configuraton of a delay evaluation circuit in central station Z, each burst B1' to B4' should be provided with an "end character" which the central station Z recognizes and toward which it "pushes" the next following sync word S2' to S4' in time. The "sync" words follow at the—unchanged—frame interval $t_R$.

At least the last bit of the "end character" and the first bit of the sync word (always of the following burst from a substation) form a guard-time when for some reasons e.g. jitter and wander, slight changes in the travelling time of the bursts or tolerances in receiver and transmitter cause an overlapping of bursts. In this case no real information is disturbed. On the other hand small free spaces between consecutive bursts at the receiver of Z can occur. Both states can be recognized by the sync- and delay evaluation circuit in the central station Z affecting small changes in the waiting periedes (W1 to W4 in FIG. 3).

Figure 5:
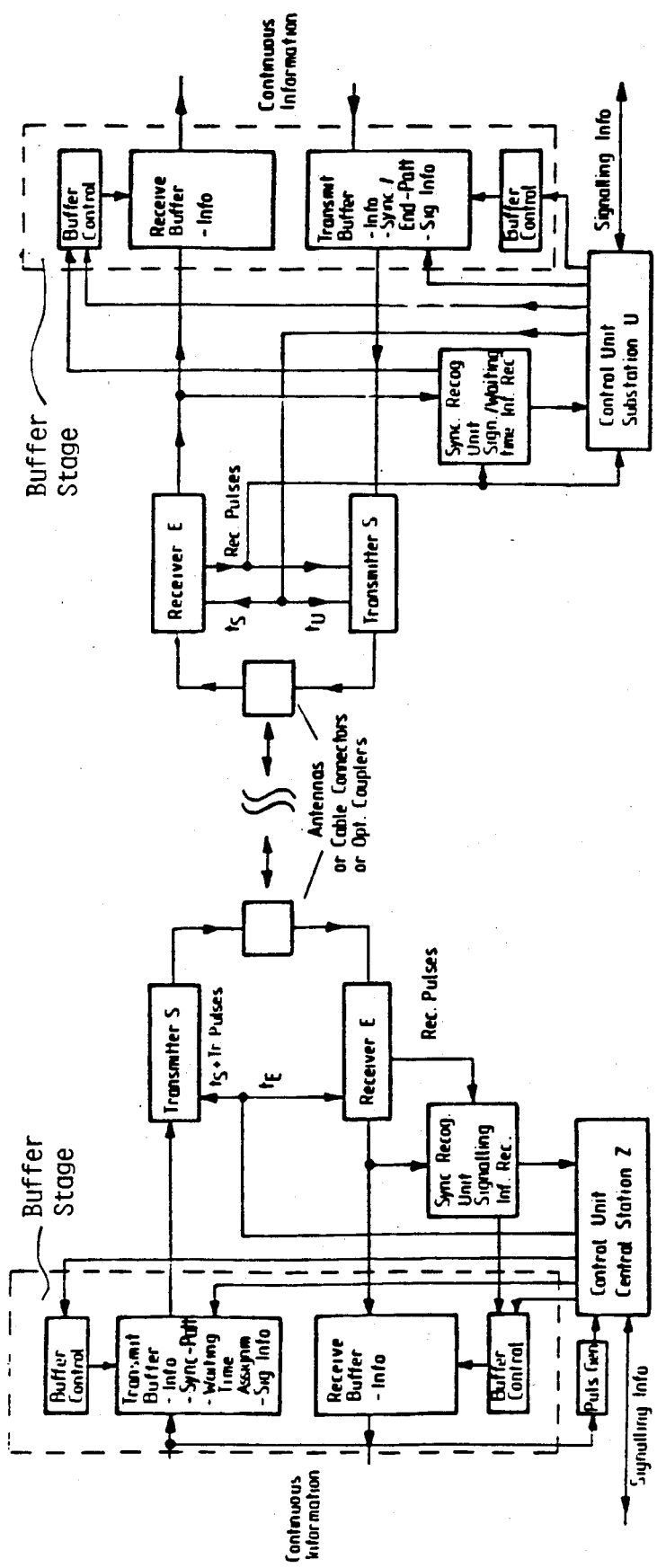
FIG. 5 shows block circuitry of a central and substation.

A suitable embodiment of circuits in central station Z and substations is illustrated in FIG. 5. Besides the different types of transmitters S and receivers E for radio transmission according to FIG. 1, comprising suitable antennas, cable transmission according to FIG. 2, comprising cable connectors, or optical fiber transmission according to FIG. 3 comprising optical couplers, there are three main circuit-blocks in each station as shown in FIG. 5. The first block is a buffer stage —dashed lines in FIG. 5—comprising a transmit and a receive buffer and buffer controls respectively, which will be built up with a microprocessor and associated memories. The buffers convert continuous to burstwise information and vice versa.

The second block is a sync recognition unit built up of shift-register, comparator and counter looking for a bit-pattern of the sync characters and indicating by a pulse when a sync character has arrived completely. By this it recognizes the arrival of the Sync Character and/or "end character" and extracts waiting time and signalling information which are transmitted in parts of these characters in consecutive bursts. It informs the receive buffer via buffer control at which moment a new burst has been received so that the incoming information can be placed correctly in the buffer.

The third main block is a control unit built up with a microprocessor and associated memories and input/output-ports. A pulse generator is connected to the control unit of the central station, which itself actuates buffer control.

In the central station Z it has to perform the following:

To calculate the length of the bursts (B1 to B4 including S1 to S4 and Sync acc. FIG. 3) out of the demands (e.g. the connected switching stations, terminals or information from a dispatcher) for transmission capacity between the central- and each substation up to the limit given by $t_S$ and the bitrate of the system. The information for this calculation is coming from the connected switching exchanges or terminals on the one side and or from similar equipment connected to the substations on the other side. The information from the substations is already transmitted to the central station (in parts of sync-characters).

To calculate the waiting times for the substations according to the different length of bursts (B1 to B4 and B1' to B4') and the known travelling times of signals ($t_1$ to $t_4$).

To alter this calculation slightly according to information coming from the Sync Recognition Unit (depending wwhether there exists a space between incoming burst or slight overlappings between end-character and the sync character of the following B'-burst).

To inform the buffer control of the transmit and receive buffer how long the bursts B1 to B4 are and where (at the transmit -side) Sync and S1 to S4 are to insert in the outgoing bitstream.

To provide the waiting time and signalling information to the transmit-buffer, so that it can be transmitted to the adressed substations.

To activate the transmitter during $t_S$ and the receiver during $t_E$.

To exchange signalling information with the already connected switching stage or terminal.

In the substations it has to perform the following:

To calculate the starting point of the burst to be transmitted (B'x) from the waiting time information and from the moment the Sync-pulse is coming from the Sync Recognition Unit.

To inform the buffer control how long the burst B'x is and activate the transmit-buffer.

To activate the transmitter during the burst of B'x and the receiver during $t_S$.

To provide signalling information for the transmit-buffer.

To exchange signalling information with the already connected switching state or terminal.

As indicated before length of the bursts depends upon the number of channels which have to be transmitted to a certain substation. If traffic demand changes, channel assignment to the substations can be changed by the control unit of central station Z. Information about channel-demand the control unit receives via the signalling information path from the interconnected switching exchanges or from a dispatcher (The total number of transmittable channels is constant and depends on $t_R$, $t_S$, $t_E$ and the bitrate of the transmission system). Between changes of burstlength the bursts remain at their defined length in each frame $t_R$.

It will be understood that the above description of the present invention is susceptible to various modifications, changes and adaptations, and the same are intended to be comprehended within the meaning and range of equivalents of the appended claims.

What is claimed is:

1. A method for operating a TDMA point-to-multipoint communications system composed of a central station and a plurality of substations, with multiple utilization of a transmission band and with the transmission time between the central station and the substations having a different value for each substation, said method comprising effecting transmission between the central station and the substations in a succession of time frames, said step of effecting transmission comprising, during each time frame:

transmitting from the central station, during a first time period, a succession of signal groups, each group being directed to a respective substation, in a sequence such that the first transmitted signal group is directed to the substation having the longest associated transmission time and the last transmitted signal group is directed to the substation having the shortest associated transmission time;

transmitting a respective signal group from each substation to the central station during a second time period following the first time period, the respective signal group being transmitted from each substation at a selected time after completion of transmission to that substation of a signal group from the central station during the first time period; and providing, in each signal group transmitted from the central station during the first time period, an indication of the selected time for transmitting from each substation during the second time period, the selected times being such that transmission from the substations during the second time period is in a sequence inverse to the sequence in which signal groups are transmitted to the substations during the first time period, the selected times including the time required for each substation to switch from a receiving state to a transmitting state.

2. A method as defined in claim 1 wherein the succession of groups transmitted during the first time period are preceded by a frame synchronizing word, and said step of providing is carried out by incorporating the indications into the frame synchronizing word.

3. A method as defined in claim 1 wherein each group transmitted during the first time period includes a synchronizing character, and said step of providing is carried out by incorporating the indication for each substation in the synchronizing character of the group transmitted by the central station and directed to that substation.

4. A method as defined in claim 1 wherein said step of effecting transmission is carried out via optical conductors connected between the central station and the substations.

5. A method as defined in claim 1 wherein said step of transmitting from the central station is carried out for causing the sequence in which the signal groups are transmitted to be in order of decreasing associated transmission times.

6. A TDMA point-to-multipoint communications system composed of a central station and a plurality of substations, with multiple utilization of a transmission band and with the transmission time between the central station and the substations having a different value for each substation, said system comprising means for effecting transmission between the central station and the substations in a succession of time frames, said means for effecting transmission comprising:

means for transmitting from the central station, during a first time period of each time frame, a succession of signal groups, each group being directed to a respective substation, in a sequence such that the first transmitted signal group is directed to the substation having the longest associated transmission time and the last transmitted signal group is directed to the substation having the shortest associated transmission time;

means for transmitting a respective signal group from each substation to the central station during a second time period of each time frame following the first time period, the respective signal group being transmitted from each substation at a selected time after completion of transmission to that substation of a signal group from the central station during the first time period; and means for providing, in each signal group transmitted from the central station during the first time period, an indication of the selected time for transmitting from each substation during the second time period, the selected times being such that transmission from the substations during the second time period is in a sequence inverse to the sequence in which signal groups are transmitted to the substations during the first time period, the selected times including the time required for each substation to switch from a receiving state to a transmitting state.

* * * * *